United States Patent Office 3,247,184
Patented Apr. 19, 1966

3,247,184
REACTIVE AZO DYES
Ulrich Blass, Basel, and Walter Wehrli, Riehen, Switzerland, assignors to Sandoz Ltd., Basel, Switzerland
No Drawing. Filed June 8, 1962, Ser. No. 200,951
Claims priority, application Switzerland, June 12, 1961, 6,801/61
5 Claims. (Cl. 260—162)

This invention relates to water-soluble reactive dyes which contain at least one group of the formula —O—arylene—(CH$_2$—NH—CO—R—Hal)$_n$ wherein R represents a divalent saturated or unsaturated aliphatic radical, which may be substituted by halogen, and has 1 to 3 carbon atoms,
n represents one of the integers 1 or 2,
Hal represents chlorine or bromine
and
Arylene represents an arylene radical of the benzene or naphthalene series which may contain low molecular alkyl or alkoxy groups, cycloalkyl groups and in addition halogen atoms.

The process comprises treating (A) Water-soluble mono- or disazo dyes bearing at least one aryl radical of the benzene or naphthalene series bound through an —O— atom, which may contain low molecular alkyl or alkoxy groups, cycloalkyl groups and in addition halogen atoms, or (B) Organic compounds bearing an aryl radical bound through an —O— atom which may contain low molecular alkyl or alkoxy groups, cycloalkyl groups and in addition halogen atoms and in addition a substituent capable of azo dye formation, with reaction products of formaldehyde or compounds which split off formaldehyde and amides of low molecular aliphatic saturated or unsaturated halogenocarboxylic acids, and converting the resulting reaction products, when they contain radicals of organic compounds with substituents capable of azo dye formation, into water-soluble azo dyes by a suitable reaction, the reactants being so chosen that the —CH$_2$—NH—CO—R—Hal groups enters into the aryl radical defined under (A) or (B).

Examples of suitable aryl radicals which may contain low molecular alkyl or alkoxy groups, cycloalkyl groups and in addition halogen atoms, and are bound to the dye radical through an O atom, are:

Phenyl; 2-, 3- and 4-methyl- or -ethylphenyl; 4-cyclohexylphenyl; 2-, 3- and 4-methoxy- or -ethoxy-phenyl; 2,4-, 2,5- and 2,6-dimethylphenyl; 2,4,6-trimethylphenyl; 2,4- and 2,5-dimethoxy- or -diethoxy-phenyl; 2-chloro-4- or -6-methylphenyl; 2-methoxy-5-methylphenyl; 2-ethoxy-5-methylphenyl; 2-methoxy-4-methylphenyl; 2-methyl-4- or -5-methoxy- or -ethoxy-phenyl; 4-chloro-2,5-dimethoxyphenyl or -diethoxyphenyl; 4-chloro-2-methoxy-5-methylphenyl; naphthyl-(1), naphthyl-(2), 2- and 4-methoxynaphthyl-(1); 2-chloro-4,6-dimethylphenyl.

The following are named as suitable compounds which split off formaldehyde: paraformaldehyde and the symmetrical dichloro- and dibromo-dimethyl ethers.

N-halogenomethyl- and N-hydroxymethylamides and the symmetrical ethers corresponding to the N-hydroxymethyl derivatives are named as reaction products of formaldehyde or compounds which split off formaldehyde and amides of low molecular aliphatic saturated or unsaturated halogenocarboxylic acids. They can be derived, for example, from the following carboxylic acids:

Chloroacetic acid, bromoacetic acid, α-bromo- or α-chloro-propionic acid, β-bromo- or β-chloro-propionic acid, α-bromo- or β-bromo-butyric acid, α-chloro- or β-chloro-butyric acid, α,β-dibromopropionic acid, α,β-dichloropropionic acid, α-chloro- or α-bromo-acrylic acid, α,β-dichloro- or α,β-dibromoacrylic acid, γ-chloro- or γ-bromocrotonic acid.

The reactive azo dyes conforming to the invention are produced by reacting N-halogenomethyl or N-hydroxymethyl derivatives of aliphatic, low molecular carboxylic acid amides, which contain an exchangeable halogen atom bound to a carbon atom such as chlorine or bromine, and if desired other substituents, or symmetrical ethers corresponding to the N-hydroxymethyl compounds, with water-soluble azo dyes or intermediates suitable for azo dye production bearing an aryl radical which is bound to the dye radical through an O atom and may contain low alkyl or alkoxy groups, cycloalkyl groups and additional halogen atoms. The reaction is carried out in sulfuric acid, preferably of 70–100% strength, or in concentrated phosphoric acid at temperatures between 0° and 60° C., but preferably at 0–30° C. The time of the reaction can vary greatly depending on the reactants, and can amount to 50 hours.

In many cases the intermediates used for azo dye production can be reacted with the N-halogenomethyl or N-hydroxymethyl compounds conforming to the invention or the symmetrical ethers corresponding to the N-hydroxymethyl compounds in place of the final azo dyes, and the resulting condensation products converted into water-soluble azo dyes by azo coupling. Intermediates of this type are e.g. diazo components such as 1-amino-4-(4'-methyl)-phenoxybenzene-2-sulfonic acid, or coupling components such as 1 - [4' - (4" - methyl)-phenoxy]-phenyl-3-methyl-5-pyrazolone, and analogous dye intermediate products.

The compounds obtained by the reaction can be easily isolated from the sulfuric or phosphoric acid solution by precipitation with water and if necessary salting out.

The dyes obtained are used for the dyeing, padding and printing of wool, silk, synthetic polyamide fibers and leather, fibers of natural and regenerated cellulose such as cotton, linen, hemp, and viscose rayon and staple fiber, in yellow, orange, brown, red and violet shades. The dyeings and prints on wool and synthetic polyamide fibers, which may be subjected to heat treatment in presence of an acid binding agent, possess excellent light and wet fastness properties (fastness to water, washing, perspiration, milling, rubbing and dry cleaning).

The dyeings and prints on cellulosic fibers which may be subjected to an alkaline treatment and if necessary a heat treatment during dyeing or after padding, are very fast to light, washing, water, perspiration, soda boiling and rubbing.

In the following examples the parts and percentages are by weight and the temperatures in degrees centigrade.

EXAMPLE 1

54.4 parts of the yellow dye obtained by coupling diazotized 1-aminobenzene-2,5-disulfonic acid with 1-[4'-(4" - methyl) - phenoxy]-phenyl-3-methyl-5-pyrazolone, are dissolved with stirring at 15–20° in 310 parts of 96% sulfuric acid. 18 parts of chloroacetic acid-N-hydroxymethylamide are added in portions at 0–5° and the mixture stirred for 2 hours at 25°. The whole is then poured onto 800 parts of ice, stirred for 10 minutes and the precipitated dyestuff then filtered off. It is stirred into 1500 parts of water, neutralized with 75 parts of sodium bicarbonate and the dye filtered off once more. It is then washed with 5% common salt solution and the filter residue dried below 40° with vacuum. A good yield of a yellow dye is obtained which dyes wool, silk and synthetic polyamide fibers in shades fast to light, washing and milling.

2 parts of the above dye are dissolved in 4000 parts of cold water and the solution heated to 40°. 2 parts of acetic acid and 3 parts of a mixture of a polyoxethylated fatty amine and an alkylpolyglycol ether are then added. 100 parts of a wool fabric are entered in this bath which is brought to the boil in 15–20 minutes, and boiling continued for 45–60 minutes. 3 parts of hexamethylene tetramine are added and dyeing continued for 20 minutes at 90°. The fabric is subsequently rinsed thoroughly, a little acetic acid being added to one lot of rinsing water, and dried. A level yellow dyeing is obtained which is fast to washing, perspiration and milling and has good light fastness.

EXAMPLE 2

27.9 parts of 3-amino-4'-methyl-1,1'-diphenyl ether-4-sulfonic acid are dissolved in 250 parts of 96% sulfuric acid at 10–15° and the solution added dropwise to a solution, already stirred for 24 hours of 12.2 parts of chloroacetamide and 7.5 parts of symmetrical dichlorodimethyl ether in 150 parts of 100% sulfuric acid. The reaction mixture is stirred for 20 hours at 10–15° and subsequently poured onto ice, upon which the reaction product is precipitated. It is then filtered off and stirred into 500 parts of water. The suspension is neutralised to pH 5–6 with sodium hydroxide solution, the product filtered off and dried at 40° with vacuum. It is subsequently diazotized in the usual way with 26–28 parts of 4-N sodium nitrite solution at 5–10°. A light gray diazo suspension is obtained which at 10–15° is added to a solution of 30 parts of 1-(2',5'-dichloro)-phenyl-3-methyl-5-pyrazolone-4'-sulfonic acid and 60 parts of sodium bicarbonate in 600 parts of water. The resulting yelow dye is already precipitated during coupling. The mass is stirred for 1 hour, and the dye filtered off. It is then stirred into 1000 parts of water, the pH value of the suspension adjusted to 5–6 with acetic acid, and then filtered off and dried with vacuum at 40°. A golden yellow dye powder is obtained which can be applied to wool from weakly acetic acid medium and to cellulose from alkaline printing pastes. The dyeings possess good light and wet fastness.

A red dyestuff with similarly good properties is obtained when under the same conditions 29 parts of 1-hydroxynaphthalene-4,6-disulfonic acid are used in place of the pyrazolone sulfonic acid mentioned.

A printing paste is prepared with:

20 parts of the dye named in the last paragraph of Example 2,
100 parts of urea
20 parts of potassium carbonate,
10 parts of sodium 3-nitrobenzene-sulfonate
3 parts of 30% sodium hydroxide solution,
450 parts of 3% sodium alginate thickening,
397 parts of water
---
1000 parts A mercerized cotton fabric is printed with this paste. The print is dried, steamed for 10 minutes at 102–104°, rinsed first with cold and then with hot water, soaped at the boil for 10 minutes with a 0.3% soap solution in distilled water, rinsed again in cold and hot water and finally dried. A red print fast to light and wet treatments is obtained.

The following table contains further reactive dyes which can be obtained by the procedures given in Examples 1 and 2, and which are characterised by the diazo and coupling components (columns (I) and (II)), the reaction conditions under which azo coupling takes place (column (III)), the reactive components (column (IV)), the moment of introduction of the reactive group before or after azo coupling (column (V)) and the shade of the dyeings on wool (column (VI)).

| Example No. | Diazo component | Coupling component | Coupling conditions | Reactive component | Introduction of the reactive group before or after azo coupling | Shade of the dyeing on wool |
|---|---|---|---|---|---|---|
| | (I) | (II) | (III) | (IV) | (V) | (VI) |
| 3 | 2-amino-benzene-1-sulfonic acid | 1-[4'-(4''-methyl)-phenoxy]-phenyl-3-methyl-5-pyrazolone | Alkaline | Chloracetic acid-N-chloromethyl-amide | After | Yellow. |
| 4 | 4-amino-benzene-1,3-disulfonic acid | 1-(4'-phenoxyphenyl)-3-methyl-5-pyrazolone | do | Di-(β-chloropropionyl-aminomethyl)-ether | do | Do. |
| 5 | 2-amino-5-methylbenzene-1-sulfonic acid | do | do | α,β-Dichloro-propionic acid-N-chloromethylamide | do | Do. |
| 6 | 2-amino-4-acetylamino-benzene-1-sulfonic acid | do | do | α-Chloroacrylicacid-N-chloromethylamide | do | Do. |
| 7 | 4-amino-4'-methyl-1,1'-diphenylether-3-sulfonic acid | 1-(2',5'-dichloro)-phenyl-3-methyl-5-pyrazolone-4'-sulfonic acid | do | Bromoacetic acid-N-hydroxy methylamide | do | Do. |
| 8 | do | 1-hydroxynaphthalene-4-sulfonic acid | do | Chloroacetic acid-N-hydroxymethylamide | do | Red. |
| 9 | do | 2-acetylamino-5-hydroxynaphthalene-7-sulfonic acid | do | do | do | Red. |
| 10 | 4-cyclohexyl-4'-aminodiphenylether-3'-sulfonic acid | 1-acetylamino-8-hydroxynaphthalene-6-sulfonic acid | do | do | do | Red. |
| 11 | do | 1-hydroxynaphthalene-5-sulfonic acid | do | do | do | Red. |
| 12 | do | 1-hydroxynaphthalene-4-sulfonic acid | do | do | do | Red-orange. |
| 13 | do | 1-hydroxynaphthalene-4,6-disulfonic acid | do | do | do | Do. |
| 14 | do | 1-hydroxynaphthalene-3-sulfonic acid | do | do | do | Do. |
| 15 | do | 1-(2',5'-dichlorphenyl)-3-methyl-5-pyrazolone-4'-sulfonic acid | do | Chloroacetic acid-N-chloromethylamide | do | Yellow. |
| 16 | do | 1-(2'-chlorophenyl)-3-methyl-5-pyrazolone | do | do | do | Do. |
| 17 | 4-aminodiphenylether-3-sulfonic acid | do | do | do | do | Do. |
| 18 | 4-cyclohexyl-4'-aminodiphenylether-3'-sulfonic acid | 2-amino-8-hydroxynaphthalene-6-sulfonic acid | Acid | Chloroacetic acid-N-hydroxymethylamide | Before | Red. |
| 19 | do | 2-(2',4',6'-trimethylphenyl)-amino-8-hydroxynaphthalene-6-sulfonic acid | do | do | do | Red. |
| 20 | 4-cyclohexyl-4'-amino-diphenylether-3'-sulfonic acid | 1-phenylamino-8-hydroxynaphthalene-4-sulfonic acid | do | do | do | Violet. |
| 21 | 4-aminodiphenylether-3-sulfonic acid | 1-acetoacetylamino-2-methoxybenzene | Alkaline | do | do | Greenish yellow. |

| Example No. | Diazo component (I) | Coupling component (II) | Coupling conditions (III) | Reactive component (IV) | Introduction of the reactive group before or after azo coupling (V) | Shade of the dyeing on wool (VI) |
|---|---|---|---|---|---|---|
| 22 | 4-aminodiphenylether-3-sulfonic acid | 1-(4'-methylphenoxy)-acetylamino-8-hydroxynaphthalene-6-sulfonic acid | Alkaline | Chloroacetic acid-N-hydroxymethylamide | Before [1] | Red. |
| 23 | ----do---- | 1-hydroxynaphthalene-4,6-disulfonic acid. | ---do--- | ----do---- | After | Red-orange. |
| 24 | ----do---- | 2-benzoylamino-5-hydroxynaphthalene-7-sulfonic acid. | ---do--- | ----do---- | Before | Do. |
| 25 | ----do---- | 1-benzoylamino-8-hydroxynaphthalene-6-sulfonic acid. | ---do--- | ----do---- | ----do---- | Red. |
| 26 | ----do---- | 1-amino-2-phenylazo-8-hydroxynaphthalene-3,6-disulfonic acid. | ---do--- | ----do---- | ----do---- | Reddish-blue. |
| 27 | 4-amino-3'-methyldiphenylether. | 1-hydroxynaphthalene-3,6-disulfonic acid. | ---do--- | α,β-Dibromopropionic acid-N-chloromethylamide. | After | Red. |
| 28** | 4-amino-4'-ethoxydiphenylether. | ----do---- | ---do--- | Chloroacetic acid-N-chloromethylamide. | ----do---- | Red. |
| 29 | 4-amino-2',4'-dimethyldiphenylether. | 1-phenyl-3-methyl-5-pyrazolone-2',5'-disulfonic acid. | ---do--- | Chloroacetic acid-N-hydroxymethylamide. | ----do---- | Yellow. |
| 30** | 4-amino-2',5'-dimethoxy-diphenylether. | 1-hydroxynaphthalene-4,6-disulfonic acid. | ---do--- | α-Bromobutyric acid-N-chloromethylamide. | ----do---- | Red. |
| 31 | 4-amino-4'-chloro-2',5'-dimethoxy-diphenylether. | 1-hydroxynaphthalene-3,6-disulfonic acid. | ---do--- | Chloroacetic acid-N-hydroxymethylamide. | ----do---- | Red. |
| 32 | 4-amino-1-phenyl-1'-naphthylether. | 1-hydroxynaphthalene-4,6-disulfonic acid. | ---do--- | ----do---- | ----do---- | Red. |
| 33** | 4-amino-4'-methoxydiphenylether. | ----do---- | ---do--- | ----do---- | ----do---- | Red. |
| 34 | 1-amino-2,4-dimethylbenzene-6-sulfonic acid. | 1-[4'-(2''-methylphenoxy)-phenyl]-5-pyrazolone-3-carboxylic acid. | ---do--- | α-Chlorobutyric acid-N-chloromethylamide. | ----do---- | Yellow. |
| 35 | 4-amino-2'-chloro-4'-methyldiphenylether. | 1-acetylamino-8-hydroxynaphthalene-4,6-disulfonic acid. | ---do--- | α-Bromopropionic acid-N-chloromethylamide. | ----do---- | Red. |
| 36** | 4-amino-2'-methoxy-5'-methyldiphenylether. | 1-acetylamino-8-hydroxynaphthalene-3,6-disulfonic acid. | ---do--- | α-Chloropropionic acid-N-chloromethylamide. | ----do---- | Red. |
| 37 | 4-amino-2',5'-dimethyldiphenylether. | 1-phenyl-5-pyrazolone-3-carboxylic acid-4'-sulfonic acid. | ---do--- | Chloroacetic acid-N-hydroxymethylamide. | ----do---- | Yellow. |
| 38** | 4-amino-3'-methoxydiphenylether. | 2-acetylamino-5-hydroxynaphthalene-7-sulfonic acid. | ---do--- | ----do---- | ----do---- | Red-orange. |
| 39** | 4-amino-2'-methyl-4'-methoxydiphenylether. | 1-phenyl-3-methyl-5-pyrazolone-2'-sulfonic acid. | ---do--- | ----do---- | ----do---- | Yellow. |
| 40 | 4-amino-2'-methoxy-4'-methyldiphenylether. | ----do---- | ---do--- | ----do---- | ----do---- | Do. |
| 41 | 4-amino-1-phenyl-2'-naphthylether. | 1-hydroxynaphthalene-3,6-disulfonic acid. | ---do--- | ----do---- | ----do---- | Red. |
| 42 | 4-amino-1-phenyl-1'-methoxynaphthyl-(2') ether. | ----do---- | ---do--- | ----do---- | ----do---- | Red. |
| 43** | 4-amino-2',4'-dimethoxy-diphenylether. | 1-acetylamino-8-hydroxynaphthalene-3,6-disulfonic acid. | ---do--- | ----do---- | ----do---- | Red. |
| 44** | 4-amino-2'-methyl-5'-ethoxydiphenylether. | 1-hydroxynaphthalene-4,6-disulfonic acid. | ---do--- | ----do---- | ----do---- | Red. |
| 45 | 4-amino-2'-chloro-4'-methoxydiphenylether. | 1-phenyl-3-methyl-5-pyrazolone-2',5'-disulfonic acid. | ---do--- | ----do---- | ----do---- | Yellow. |
| 46 | 4-amino-4'-ethyldiphenylether. | 1-benzoylamino-8-hydroxynaphthalene-3,6-disulfonic acid. | ---do--- | ----do---- | ----do---- | Red. |
| 47 | 4-amino-1-phenyl-4'-methyl-1'-naphthylether-3-sulfonic acid. | 1-acetylamino-8-hydroxynaphthalene-4,6-disulfonic acid. | ---do--- | ----do---- | Before | Red. |

[1] The diazo component is reacted with the reactive component before the azo coupling, so that in the final dye the reactive group is bound to the phenoxy group of the diazo component.

**Asterisks at Examples 28, 30, 33, 36, 38, 39, 43, 44 indicate the possibility to introduce more than one reactive group —CH₂—NH—CO—R—Hal into the —O— aryl group of the dye molecule.

Formulae of representative dyes of the foregoing examples are as follows:

*Example 1*

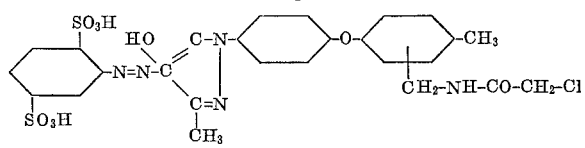

*Example 2*

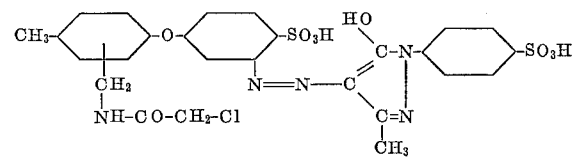

*Example 10*

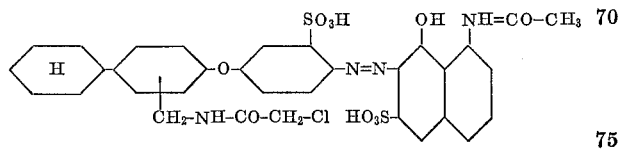

*Example 13*

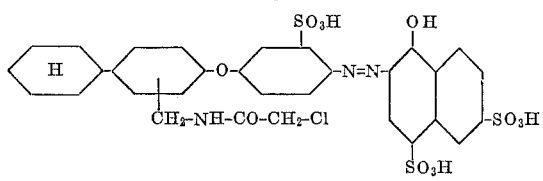

*Example 16*

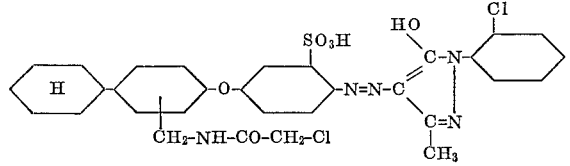

*Example 22*

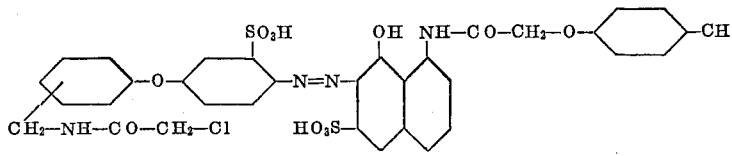

*Example 23*

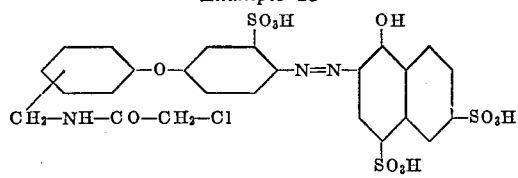

Having thus disclosed the invention what we claim is:
1. The water-soluble reactive azo dye of the formula

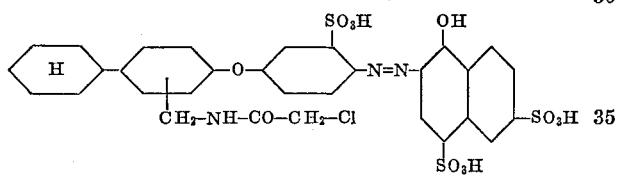

2. The water-soluble reactive azo dye of the formula

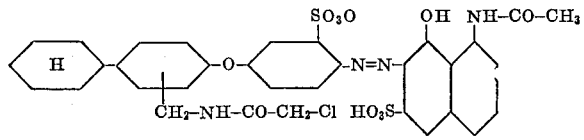

3. The water-soluble reactive azo dye of the formula

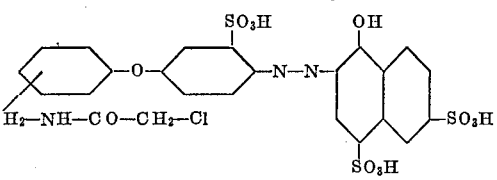

4. The water-soluble reactive azo dye of the formula

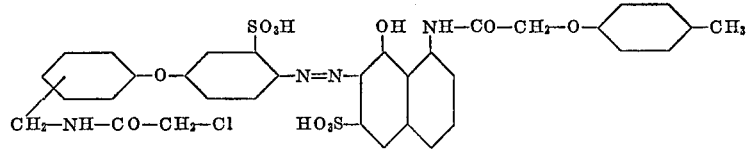

5. The water-soluble reactive azo dye of the formula

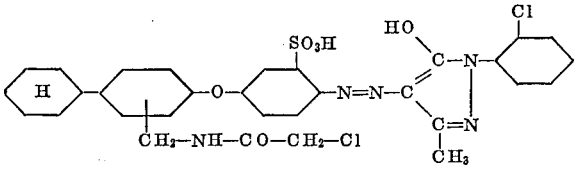

References Cited by the Examiner
UNITED STATES PATENTS
2,975,167  3/1961  Schwander et al. _____ 260—162

OTHER REFERENCES
Wegmann, "Textile-Praxis," October 1958, pp. 1056–1061.

CHARLES B. PARKER, *Primary Examiner.*